(12) United States Patent
Guillon (10) Patent No.: US 8,342,300 B2
(45) Date of Patent: Jan. 1, 2013

(54) ENERGY ADSORBER DEVICE THAT ADAPTS AUTOMATICALLY TO THE WEIGHT IT SUPPORTS

(75) Inventor: Gérard Guillon, Mandelieu la Napoule (FR)

(73) Assignee: Eurocopter, Marignane Cedex (FR)

( * ) Notice: Subject to any disclaimer, the term of this patent is extended or adjusted under 35 U.S.C. 154(b) by 965 days.

(21) Appl. No.: 12/267,020

(22) Filed: Nov. 7, 2008

(65) Prior Publication Data

US 2010/0170759 A1  Jul. 8, 2010

(30) Foreign Application Priority Data

Nov. 8, 2007  (FR) ...................................... 07 07833

(51) Int. Cl.
*F16F 9/34* (2006.01)
(52) U.S. Cl. ........................................ 188/275; 188/313
(58) Field of Classification Search .................. 188/275, 188/313; 267/64.11, 64.15, 64.16, 64.22, 267/64.26, 117, 120, 131; 297/216.1, 216.13, 297/216.16, 216.17, 216.2
See application file for complete search history.

(56) References Cited

U.S. PATENT DOCUMENTS

| | | | |
|---|---|---|---|
| 3,701,499 A | | 10/1972 | Schubert et al. |
| 4,358,154 A | * | 11/1982 | Campbell ................ 297/216.17 |
| 4,408,738 A | * | 10/1983 | Mazelsky .................. 244/122 R |
| 4,423,848 A | * | 1/1984 | Mazelsky .................. 244/122 R |
| 5,273,240 A | * | 12/1993 | Sharon ...................... 244/122 R |
| 5,538,117 A | | 7/1996 | Bouchez |
| 7,921,973 B2 | * | 4/2011 | Wereley et al. ............... 188/266 |

FOREIGN PATENT DOCUMENTS

| | | |
|---|---|---|
| EP | 0075067 | 3/1983 |
| EP | 0682191 | 11/1995 |

OTHER PUBLICATIONS

Search Report dated Apr. 8, 2008, in French Priority Application.

* cited by examiner

*Primary Examiner* — Bradley King
*Assistant Examiner* — Nicholas J Lane
(74) *Attorney, Agent, or Firm* — Brooks Kushman P.C.

(57) ABSTRACT

The present invention relates to an energy absorber device (1) for damping the movements of a load support (2) relative to a stationary base (3), the load support being connected to the stationary base (3) via a hydromechanical connection. The device includes automatic and self-contained setting elements serving firstly to adapt under static conditions to the weight of the loads supported by the support (2), and secondly under dynamic conditions, e.g. in the event of a sudden movement of the crash type, to subject the subassembly including the support (2) and the loads to acceleration or deceleration values that are below a threshold value.

11 Claims, 6 Drawing Sheets

ENERGY ADSORBER DEVICE THAT ADAPTS AUTOMATICALLY TO THE WEIGHT IT SUPPORTS

FIELD OF THE INVENTION

The present invention relates to the general technical field of the aviation or the automotive industry, and more precisely to the technical field of all kinds of suspension system, such as for example undercarriages or seats in an aircraft.

More particularly, the present invention relates to an energy absorber device having the special feature of adapting to the mass that it needs to decelerate, in a manner that is simple and reliable.

For example, an application of the invention lies in helicopter seats where it is desirable to improve anti-crash behavior.

BACKGROUND OF THE INVENTION

Civilian and military standards specify a weight range extending from 46.5 kilograms (kg) to 96 kg for people who ought to survive a crash. The strength of bone structure in withstanding intense compression, e.g. as a result of a sudden acceleration, varies significantly within this population range. There is thus a real problem of matching such morphological variation to the strength and damping characteristics of seats, in particular in helicopters. The mass in question can also vary as a function of the number of seats that are actually occupied on a bench seat.

The stroke of an energy absorber therefore needs to be adapted to the entire potential weight range of the occupant(s). If such a stroke is too short, then a heavy occupant runs the risk of being injured since the absorber system comes into abutment, thereby preventing any further damping. On the contrary, if the stroke corresponds to a heavy occupant, then the system will be overdimensioned and the acceleration to which a light occupant will be subjected will not be damped sufficiently.

Certain known seats are fitted with manual adjuster systems enabling the deceleration of the damper to be adapted to the weight of the occupant. That requires human intervention that can lead to adjustment being forgotten or performed wrongly. Such systems are also often heavy, bulky, and expensive.

Energy absorber systems are also known that limit peak downward force so that the peak downward force remains constant during the stroke of the absorber. However variations in weight from one individual to another are not taken into account.

OBJECTS AND SUMMARY OF THE INVENTION

The object of the invention consequently seeks to propose a novel energy absorber device that does not present the above-listed drawbacks and that operates using means that are simple and reliable so as to ensure that the acceleration or deceleration to which a passenger is subjected is kept below a threshold value, independently of the weight of the passenger and without prior adjustment.

Another object of the invention seeks to propose a novel energy absorber device that operates in self-contained manner so as to ensure that its reliability is not degraded by malfunction of some other system such as an electrical or hydraulic power supply.

Another object of the invention seeks to provide a novel energy absorber device that is compact so as to enable it to be fitted to existing seats or to existing multi-seat benches.

The objects given to the invention are achieved with the help of an energy absorber device for damping the movements of a load support relative to a stationary base, said load support being connected to the stationary base via a hydro-mechanical connection, wherein the device includes automatic and self-contained setting means serving firstly to adapt under static conditions to the weight of the loads supported by the support, and secondly under dynamic conditions, e.g. in the event of a sudden movement of the crash type, to subject the subassembly comprising the support and the loads to acceleration or deceleration values that are below a threshold value.

By optimally controlling the throttling of the hydraulic fluid, the device in accordance with the invention enables the accelerations to which the occupants of seats provided with such a device are subjected to be peak-limited, thereby acting during a crash to maintain said accelerations substantially constant at a safe threshold value. This value is about 14 g (i.e. 14 times the acceleration due to gravity) if it is desired to avoid injuring the occupant. The device in accordance with the invention is particularly remarkable wherein this is achieved over a very wide range of size and weight for the occupants, e.g. extending from 26 kg to 116 kg.

In an embodiment, the automatic setting means comprise static setting means and dynamic setting means that are independent of each other, the static setting means enabling a first automatic adjustment to be performed that depends on the weight of the loads, and the dynamic setting means enabling a second adjustment to be performed that depends on the acceleration to which the subassembly comprising the support and the loads is subjected.

In an embodiment, the setting means comprise a mechanism for throttling hydraulic fluid to control the flow rate of the hydraulic fluid between a high pressure chamber in which the hydraulic fluid is compressed by a movement of the support, and a low pressure chamber into which the throttled hydraulic fluid escapes.

In a preferred embodiment, the high pressure and low pressure chambers are defined by cylindrical telescopic elements, a moving outer element defining part of the moving high pressure chamber that is secured to the support, and an inner stationary portion defining part of the low pressure chamber that is secured to the stationary base.

In a preferred embodiment of the device in accordance with the invention, the hydraulic fluid throttling mechanism comprises:

a heavy element that is movable relative to the stationary portion, thereby loading a first calibrated return spring under the effect of a high acceleration; and a moving core that is movable relative to the stationary portion, thereby loading a second calibrated return spring, said core defining part of a control chamber in the high pressure chamber and, as a function of its position, authorizing direct throttling of hydraulic fluid from the high pressure chamber towards the low pressure chamber;

said core being controlled to move in translation, above the acceleration or deceleration threshold value, by the pressure difference between the high pressure chamber and the low pressure chamber, as a function of the combined position of the heavy element and of a flow rate limiter, the position of the flow rate limiter being representative of the weight supported by the subassembly comprising the support and the loads;

said core acting, as a function of the relative positions of the core and of the heavy element to enable the high pressure chamber to communicate with the low pressure chamber via at least one calibrated feed orifice and via an internal chamber of the heavy element;

said internal chamber also presenting at least one additional orifice communicating with the control chamber and an exhaust orifice suitable for causing said internal chamber to communicate with the low pressure chamber;

said exhaust orifice being associated with the flow rate limiter that enables the throttling section of the exhaust orifice to be adjusted as a function both of the position of the flow rate limiter in the internal chamber and also of the position of the heavy element relative to the stationary portion;

said flow rate limiter being positioned in the internal chamber of the heavy element under the effect of the initial pressure that exists in the control chamber as generated by the weight of the subassembly comprising the support and the loads;

said flow rate limiter moving, under the effect of a high acceleration, together with the heavy element independently of its prepositioning in the internal chamber; and said flow rate limiter loading a third calibrated return spring housed in the low pressure chamber and bearing against the stationary portion.

In an embodiment, the heavy element is a cylindrical punch, with the core, the high pressure chamber, the low pressure chamber, and the control chamber being coaxial around said cylindrical punch.

In an embodiment, the low pressure chamber is defined in part by a piston, which piston is held in place in the stationary portion by an abutment of the polyamide index ring type, so as to release said piston to move when a predetermined pressure is reached in the low pressure chamber, by causing the abutment to break or to be deformed, e.g. irreversibly.

In an embodiment, the flow rate limiter includes mechanical means imparting movement in rotation simultaneously with axial sliding movement in the internal chamber under the effect of the pressure that exists in the control chamber and correspondingly modifying the throttling section through the exhaust orifice when said orifice is open as a result of the axial movement of the flow rate limiter entrained by the heavy element in response to a high acceleration.

The objects given to the present invention are also achieved with the help of a seat or a bench, in particular for an aircraft, including at least one energy absorber device as described above.

The objects of the present invention are also achieved with the help of an undercarriage, in particular for an aircraft, including at least one energy absorber device as described above.

The objects of the present invention are also achieved with the help of a wheel suspension system, in particular for an aircraft, including at least one energy absorber device as described above.

The objects of the invention are also achieved with the help of a structure carrying a heavy load such as a main transmission gearbox of a helicopter that is dangerous for occupants beneath said structure in the event of a crash, which structure includes at least one energy absorber device as described above. It is thus possible to avoid overdimensioning the structures, which structures must be capable of withstanding accelerations of about 48 g.

The objects of the invention are also achieved with the help of a safety deforming structure such as road or rail vehicle front bodywork that includes an energy absorber device as described above. The cabin can thus limit accelerations to a peak of 14 g. Under such conditions it is possible to envisage reducing or even eliminating deformation zones of the cabin while nevertheless guaranteeing good safety for the occupants.

BRIEF DESCRIPTION OF THE DRAWINGS

Other features and advantages of the invention appear in greater detail on reading the following description and with the help of the accompanying given purely by way of non-limiting illustration, in which.

MORE DETAILED DESCRIPTION

Figure 1:
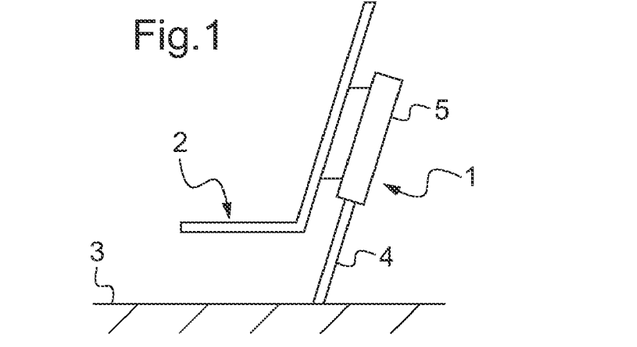
FIG. 1 is a diagram showing an example of an application for an energy absorber device according to the invention, and specifically a seat.

FIG. 1 shows an energy absorber device 1 in accordance with the invention connecting a seat 2 to a stationary base 3. By way of example the base is constituted by the floor of a helicopter. The device 1 includes a stationary portion 4 secured to the floor and a moving portion 5 secured to the seat 2. The stationary and moving portions 4 and 5 are cylindrical and telescopic and relative movements between them are damped by a hydraulic fluid throttling mechanism.

Figure 2:
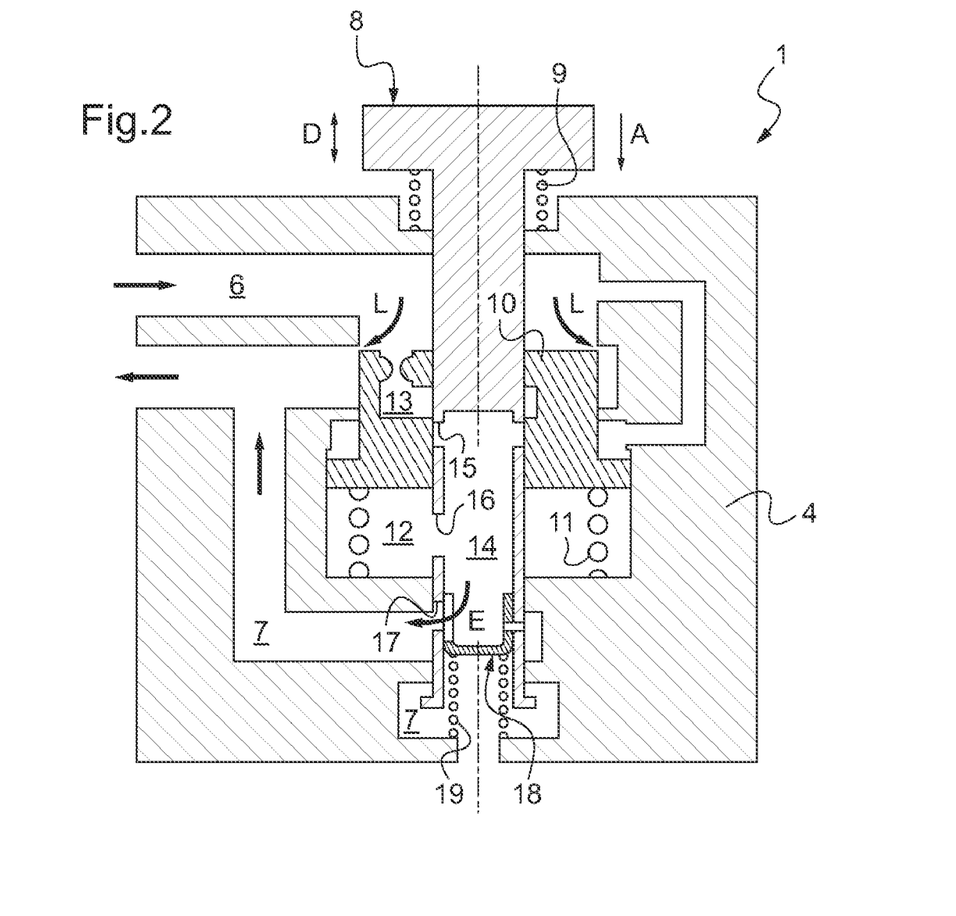
FIG. 2 is a diagram showing the operation of an energy absorber device in accordance with the invention.

FIG. 2 serves to show the operation of an energy absorber device 1 in accordance with the invention. The device includes automatic and self-contained setting means incorporating a hydraulic fluid throttling mechanism controlling the flow rate of said fluid between a high pressure chamber 6 and a low pressure chamber 7. The pressure that exists in the high pressure chamber 6 is associated with the compression of the hydraulic fluid as a result of a movement of a load support. By way of example, this support constitutes the seat 2, and the loads represent one or more passengers.

The moving portion 5 presents an outer element defining the outside of the high pressure chamber 6 which is consequently movable, and the stationary portion 4 defines the outside of the stationary low pressure chamber 7.

The hydraulic fluid throttling mechanism enables hydraulic fluid to be caused to flow towards the low pressure chamber 7 in response to high levels of stress.

The throttling mechanism comprises a heavy element 8 that is movable relative to the stationary portion 4 while loading a first calibrated return spring 9. The movements of the heavy element 8 are represented by arrow D. If the device 1 is subjected to a high level of acceleration, the first return spring 9 is subjected to compression in the direction of arrow A.

The throttling mechanism also includes a core 10 that is movable relative to the stationary portion 4 while loading a second calibrated return spring 11. The core 10 defines a portion of a control chamber 12 in the high pressure chamber 6. The core 10 is caused to begin to move in translation and thus to open the passage for direct throttling of the fluid, as represented by arrows L, only once the heavy element 8 is subjected to an acceleration exceeding a predetermined acceleration, e.g. 14 g. The punch or plunger 8a then begins to open an exhaust orifice 17 that empties the fluid from the control chamber 12 of the core 10.

The core 10 does not move in response to high levels of acceleration, but moves relative to the stationary portion 4 and relative to the heavy element 8 under the effect of the hydraulic fluid in the high pressure chamber 6 being compressed and under the effect of the position of the heavy element 8.

Depending on the relative position of the heavy element 8, the core 10 has a passage 13 capable of putting the high pressure chamber 6 into communication with the control chamber 12 via an internal chamber 14 of the heavy element 8, which chamber is provided with at least one calibrated orifice 15 for this purpose.

The internal chamber 14 also presents at least one complementary orifice 16 providing direct communication with the control chamber 12, and also an exhaust orifice 17 suitable for putting the internal chambers 12 and 14 into communication with the low pressure chamber 7. Throttling through the exhaust orifice 17 is represented by arrow E.

In the event of high acceleration, of the kind that might harm the integrity of the loads or the occupants of a seat, throttling via the exhaust orifice 17 controls direct throttling (arrows L) in such a manner as to obtain deceleration that is substantially constant and matched to the mass of the loads.

The exhaust orifice 17 is associated with a flow rate limiter 18 that serves to adjust the throttling section of the exhaust orifice 17 as a function of the position of said flow rate limiter 18 in the internal chamber 14 and also as a function of the position of the heavy element 8 relative to the stationary portion 4.

The flow rate limiter 18 is positioned in the internal chamber 14 under the effect of the initial pressure that exists in the control chamber 12, said initial pressure being generated by the mass of the subassembly comprising the support 2 and the loads, and transmitted from the high pressure chamber 6 to the internal chamber 14 via the orifices 13 and 15.

The flow rate limiter 18 moves independently of the heavy element 8 and it is prepositioned in the internal chamber 14 by loading a third calibrated return spring 19 that is received in the low pressure chamber 7 and that bears against the stationary portion 4.

Figure 3A:
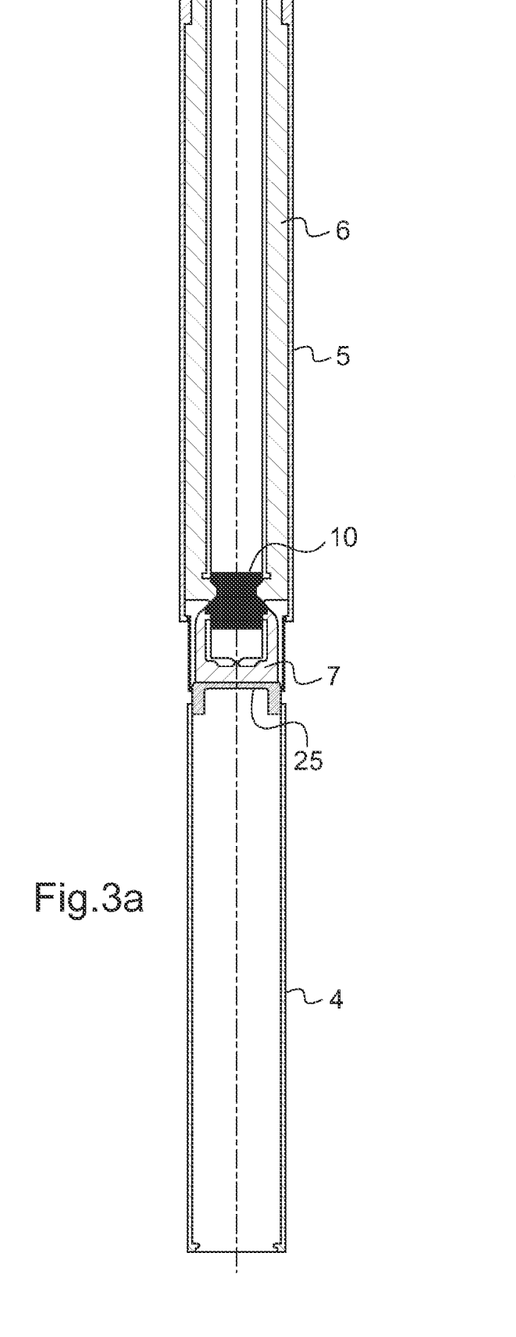
FIGS. 3a and 3b show part of the operation of an embodiment of the energy absorber device in accordance with the invention.
Figure 3B:
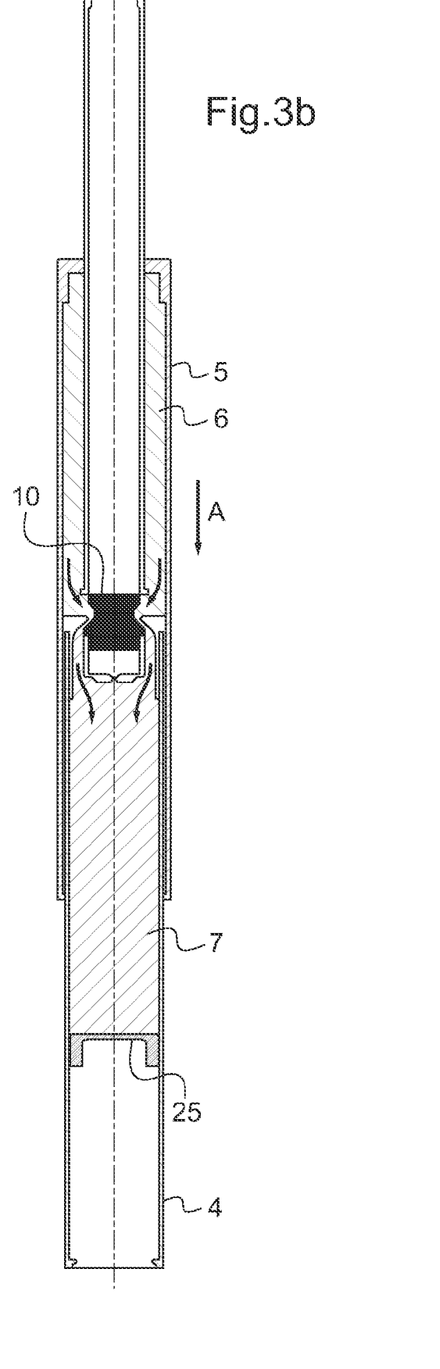

FIGS. 3a and 3b show the movement of the moving portion 5 relative to the stationary portion 4 along arrow A. The hydraulic fluid is then compressed in the high pressure chamber 6, giving rise to movement of the core 10 and to direct throttling of the fluid towards the low pressure chamber 7 only from a predetermined acceleration threshold, preferably 14 g, referred to as the safety threshold. Below this pressure, the moving portion 5 remains stationary reactive to the stationary portion 4 whatever the level of force applied between those two portions.

Figure 4:
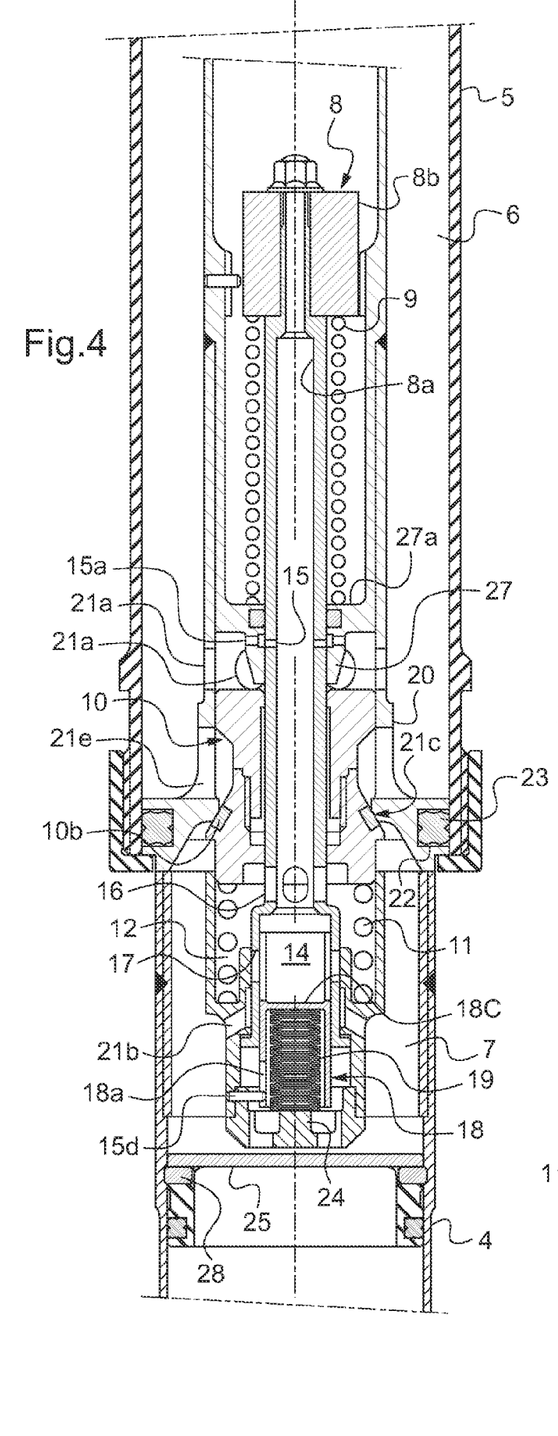
FIG. 4 is a longitudinal section view of an embodiment of an energy absorber device in accordance with the invention.
Figure 5:
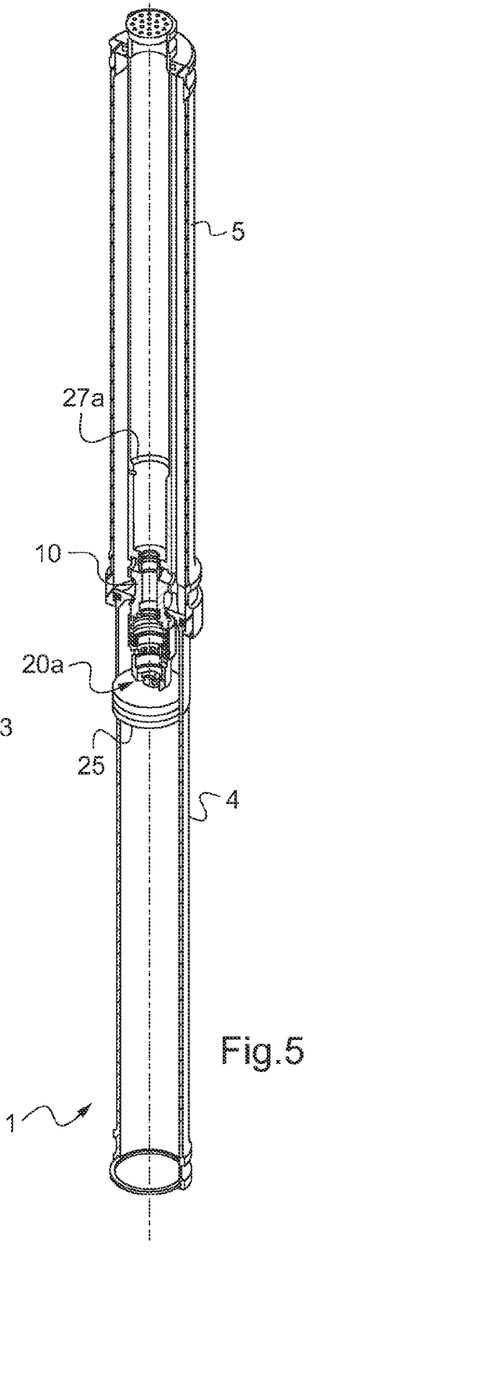
FIG. 5 is a partially cutaway perspective view showing an embodiment of an energy absorber device in accordance with the invention (omitting the heavy element and the punch) showing the various fluid communication orifices between the chambers.

The heavy element 8 shown in FIG. 4 is constituted, for example, by a cylindrical punch or plunger 8a that is surmounted by a calibrated weight 8b. The core 10 and the high pressure, low pressure, and control chambers 6, 7, and 8 are coaxial around the cylindrical punch 8a.

The control chamber 12 is defined by a casing 20 that also serves to guide the core 10. Openings 15a are provided in the casing 20, and they correspond to the openings 13 in FIG. 2. The surface area of the core 10 that is in contact with the chamber 6 is equal to the surface area in contact with the control chamber 12 so as to ensure that movement of the core 10 is driven solely by the pressure difference due to the control chamber 12.

The casing 20 also has additional exhaust orifices 21b through which there flows the fluid throttled by the flow rate limiter 18 and the exhaust orifice 17.

Figures 6, 7, 8, 9:
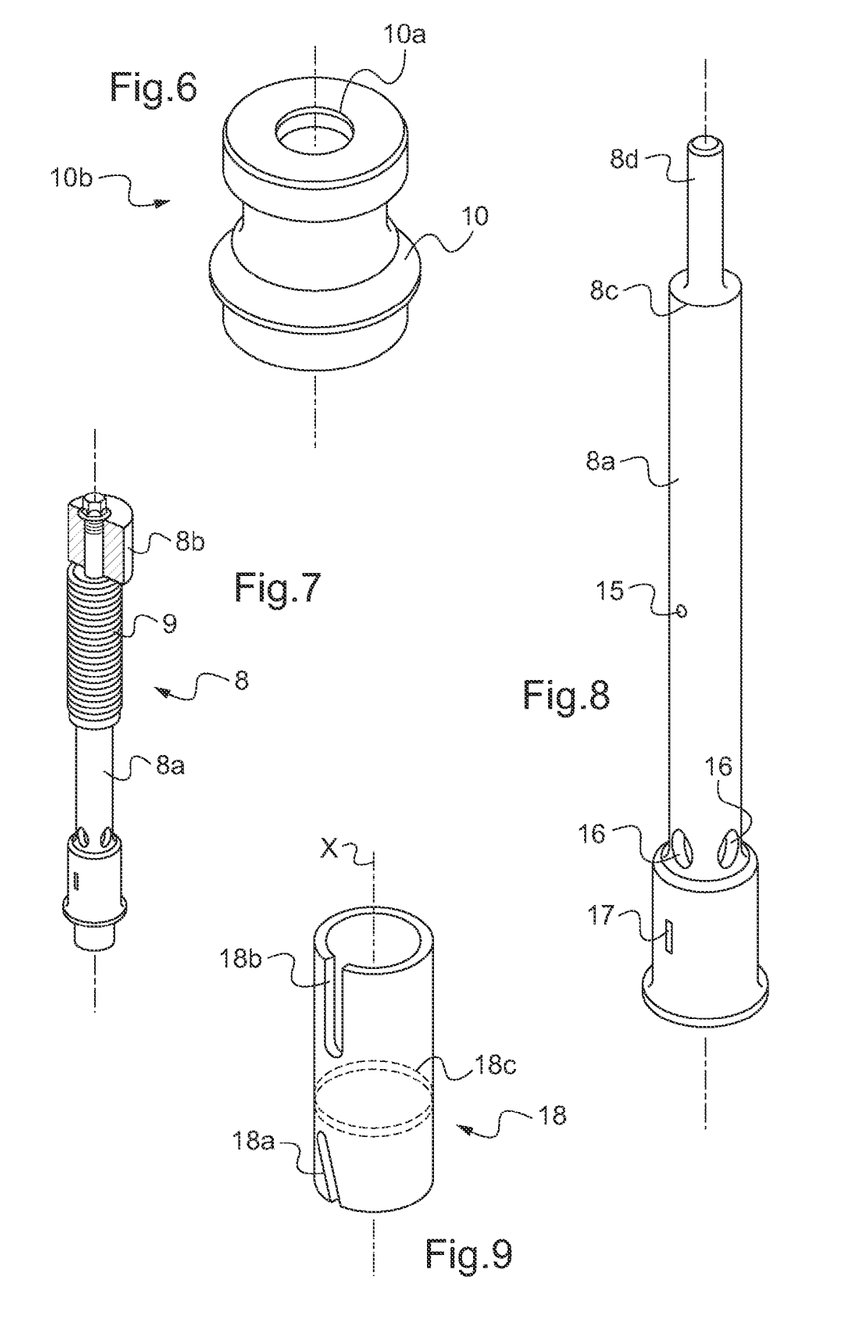
FIGS. 6 to 11 show structural details of the control elements of the energy absorber device of FIG. 5.

FIGS. 6 to 11 show details of the embodiment of the energy absorber device shown in FIG. 4. FIG. 6 thus shows the core 10, e.g. as obtained by screwing together two light alloy parts, themselves obtained by turning.

The core 10 is provided with a through central hole 10a for engaging on the punch 8a of the heavy element 8, as shown in FIGS. 7 and 8. A gasket 10b is incorporated in the core 10 in order to confine the fluid in the high pressure chamber 6 so long as the core 10 remains stationary.

The punch 8a is a hollow cylinder provided with at least one calibrated orifice 15 in a substantially central portion. The top end of the punch 8a has a shoulder 8c and a portion 8b of a cylinder of radius smaller than the central portion. This portion serves for monitoring the calibrated mass 8b.

The bottom end of the punch 8a includes a hollow cylindrical portion of greater radius in which the exhaust orifice 17 is formed, which orifice is preferably substantially rectangular. This cylindrical portion of larger radius constitutes a portion of the internal chamber 14 by incorporating in leak-tight manner a portion of the flow rate limiter 18. The additional orifices 16 are formed in the punch 8a substantially in the vicinity of its bottom end so as to obtain hydraulic fluid communication between the chambers 12 and 14.

Figure 10:
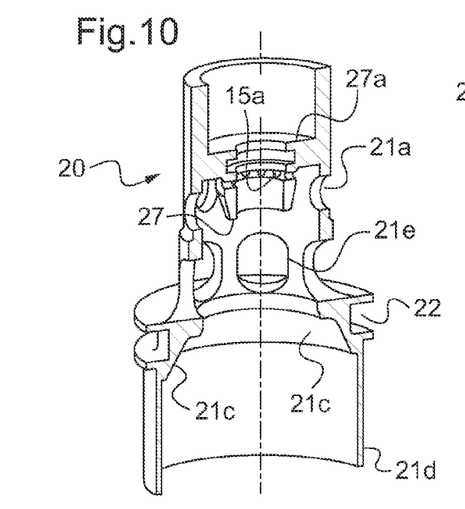

The casing 20 shown in a partially cutaway perspective view in FIG. 10, is secured to the stationary portion 4 and comprises a cylindrical portion 21b that is substantially coaxial about the internal chamber 14 and that is designed to contain a complex part 20a that defines the control chamber 12 of the core 10. The complex part 20a is shown in a partially cutaway perspective view in FIG. 11.

The cylindrical portion 21d is extended inwardly by a frustoconical portion 21c against which the core 10 comes into abutment via a frustoconical shoulder formed by the corresponding gasket 10b. The cylindrical portion 21d presents externally, substantially at the same level as the frustoconical portion 21c, an annular groove 22 that is designed to receive a sealing gasket 23. This gasket serves to provide the high pressure chamber 16 with the sealing that is essential for proper operation of the device when the moving portion 5, specifically the outer cylinder defining said high pressure chamber 6, slides on the stationary portion 4.

In line with the annular groove 22, the casing 20 includes a cylindrical portion of smaller radius provided with peripheral openings 21e leading to the high pressure chamber 6 and through which the hydraulic fluid can flow towards the low pressure chamber 7 while the fluid is being throttled directly, i.e. when the core 10 does not bear against the frustoconical portion 21c. In line with the peripheral openings 21e, this smaller-radius cylindrical portion presents openings 21a that are disposed above the top end of the core 10.

Substantially in register with the openings 21a and coaxially therein, the smaller-radius cylindrical portion includes internally a guide portion 27 for the punch 8a. The guide portion 27 includes the feed openings 15a that enable the internal chamber 14 to be fed with hydraulic fluid via the calibrated orifices 15 of the punch 8a, when said punch 8a is in its high extreme position and, as shown in FIG. 4. The guide portion 27 also presents an internal shoulder 27a against which the first calibrated return spring 9 bears. The first return spring 9 is thus engaged between the shoulder 27a and the weight 8b.

In the embodiment of FIG. 4, the feed orifices 15a replace both structurally and functionally the passage 13 formed in the core 10 as shown in FIG. 2.

Figure 11:
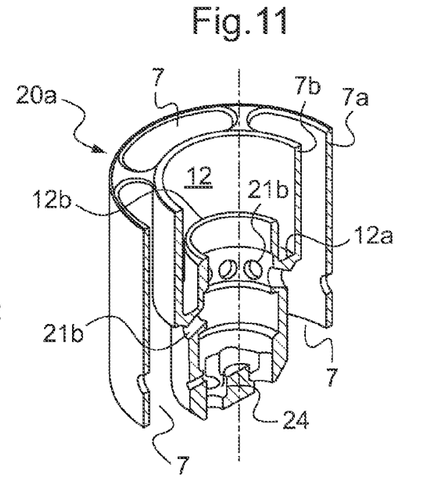

The cylindrical outer wall 7a and the cylindrical inner wall 7b of the complex part 20a define the low pressure chamber 7. The inner wall 7b also defines the outside of the control chamber 12. The control chamber has an annular end 12a against which the second calibrated return spring 11 bears, when loaded by a movement of the core 10.

An inner guide wall 12b is also provided for guiding movement in translation of the bottom end of the punch 8a and for closing the exhaust orifice 17 when the plunger is not in a position that allows hydraulic fluid to be throttled through said exhaust orifice 17, i.e. when below the acceleration safety threshold.

Towards the bottom of the inner guide wall 12b, additional exhaust orifices 21b allow the throttled hydraulic fluid to flow into the low pressure chamber 7 via the exhaust orifice 17 and via the flow rate limiter 18.

The bottom end of the complex part 20a also has a central stud 24 for supporting the third calibrated return spring 19 that is loaded by movement of the flow rate limiter 18. By way of example, the third return spring 19 is, constituted as an assembly of Belleville-type spring washers, giving it stiffness that is non-linear. In addition to being compact, this makes it possible to secure the flow rate limiter 18 in its prepositioning and to avoid interfering with the movement of the punch 8a in response to a high level of acceleration.

The low pressure chamber 7 is defined in part by a piston 25 that is retained in position in the stationary portion 4 by an abutment 28, such as a ring or an index finger made of polyamide (PTFE), so as to release movement of said piston 25 when a predetermined pressure is reached in the low pressure chamber 7, by causing said abutment 28 to break in shear or in deformation, e.g. irreversibly. The abutment is configured not to yield during normal everyday movements of the stationary base 3, and it is not subjected to any fluid pressure so long as the core 10 has not begun to open the orifice 21c.

Figures 12, 13:
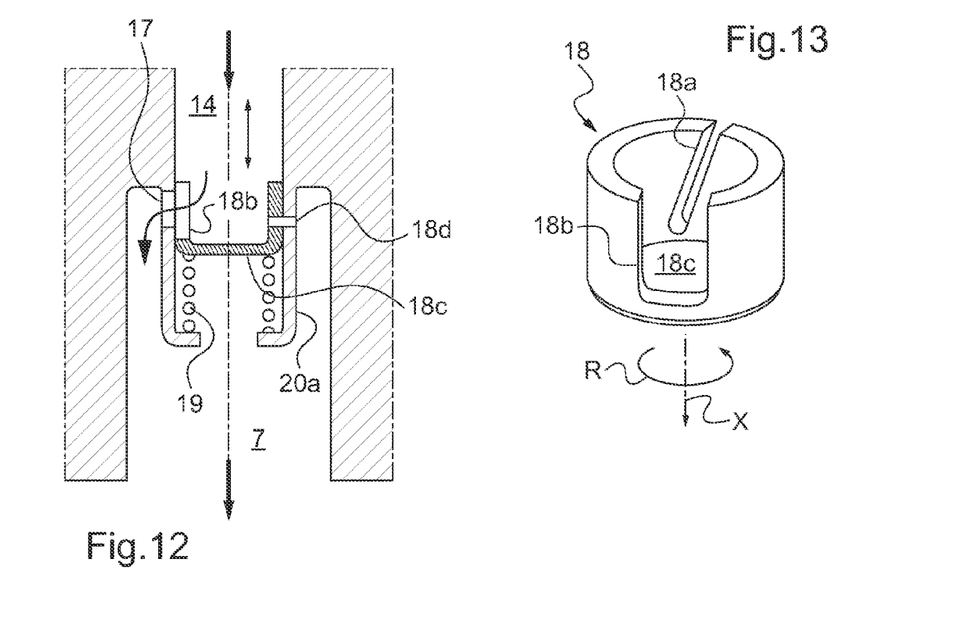
FIGS. 12 and 13 are functional diagrams of the flow rate limiter for the exhaust orifice incorporated in the energy absorber device in accordance with the invention.

Advantageously, the flow rate limiter 18 includes mechanical means that impart rotary movement R thereto simultaneously with axial sliding movement X in the internal chamber 14 under the effect of the pressure that exists in the control chamber 12, thereby modifying in corresponding manner the throttling section of the exhaust orifice 17 when the exhaust orifice 17 is opened at least in part by axial movement of the flow rate limiter 18 under drive from the heavy element 8, in response to a high level of acceleration.

FIG. 9 is a perspective view showing an embodiment of the flow rate limiter 18, also shown in section in FIG. 4. The flow rate limiter 18 is constituted by a hollow cylinder presenting two portions of substantially the same length, and separated by a separator wall 18c. The separator wall constitutes the bottom of the internal chamber 14. In its top edge, the top portion includes a substantially rectangular open-ended axial slot 18b. The axial slot 18b is designed to be positioned in register with the exhaust orifice 17 and to close it to a greater or lesser extent as a function of the angular position of the axial slot 18b.

From its bottom edge, the bottom portion has an oblique slot 18a in which there is engaged a peg 18d that is securely fastened to the complex part 20a. Thus, when the flow rate limiter 18 slides downwards under the effect of pressure in the internal chamber 14, the peg 18d simultaneously imparts rotary movement to said flow rate limiter 18. The accessible relative positions of the axial slot 18b and of the exhaust orifice 17 then define different throttling sections. These relative positions are obtained by movement in translation combined with movement in rotation of the flow rate limiter 18.

The operation of the energy absorber device in accordance with the invention is described below with reference to FIG. 4, in an application relating to a helicopter seat.

When a passenger (load) sits on the seat (support), the seat compresses the hydraulic fluid in the high pressure chamber 6. The moving element 5 is a cylinder secured to the seat. Under static conditions, the feed orifices 15a and the calibrated orifices 15 are in communication and enable an initial pressure to be established in the control chamber 12 and in the internal chamber 14 that depends on the weight of the passenger. This initial pressure prepositions the flow rate limiter 18 so as to present a determined throttling section in the event of a high acceleration exceeding the value of 14 g. The exhaust orifice 17 nevertheless remains closed because of the unchanged initial position of the punch 8a. When the punch 8a moves axially, it is by means of the fluid exhaust that it controls movement of the core 10, with this happening above the acceleration or deceleration threshold value.

When the passenger is subjected to a compression force, e.g. as the result of a crash, this force is either absorbed by said passenger, or else it is transmitted via the seat to the energy absorber device, assuming that the device is properly set for absorbing the corresponding amount of energy.

Once the punch 8a or the heavy element presents acceleration exceeding the predetermined calibration threshold, e.g. 14 g, the pressure difference between the high pressure chamber 6 and the control chamber 12 causes the core 10 to move against the return force of the second calibrated return spring 11, and consequently causes the hydraulic fluid to be throttled directly on its way towards the low pressure chamber 7. Direct throttling takes place because the gasket 10b separates from its bearing surface, i.e. the frustoconical abutment 21c. Nevertheless, this direct throttling must be modulated so as to maintain the mass of the passenger(s) at a constant deceleration threshold.

The high acceleration to which the passenger supported by the seat is subjected is also applied to the energy absorber device 1. This high acceleration causes the weight 8b and the punch 8a to move so as to open the exhaust orifice 17 and throttle the flow of hydraulic fluid towards the low pressure chamber 7. The throttling section varies during the crash by the combination of the automatic prepositioning of the flow rate limiter 18 as a function of the weight of the passenger, and of the acceleration control of the exhaust orifice 17 of the heavy element 8 or of the punch 8a. During this throttling stage, the calibrated orifices 15 of the punch 8a remain closed.

When the level of acceleration or deceleration decreases, the punch 8a returns towards its initial high position. On going back through the pre-established safety acceleration threshold, the second calibrated return spring 18 drives the core 10 upwards so as to bear against the frustoconical abutment 21c. The energy dissipation stage performed by the device has then terminated. The movement of the passenger(s) then continues, subjected to the end-of-crash deceleration that has gone back to a level that is not critical. The device of the invention remains intact and without damage for the occupants it protects.

The head loss that results from throttling through the exhaust orifice 17 controls the descent of the core 10. As a result the energy absorption by the device in accordance with the invention takes account of the mass of the passenger(s) in such a manner as to maintain the acceleration to which said passenger(s) is/are subjected substantially constant.

Figure 14:
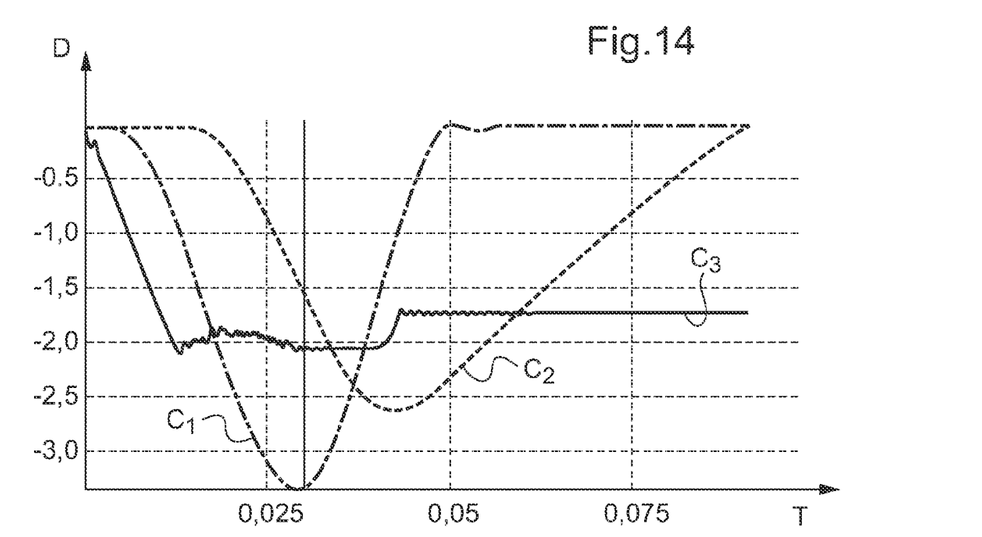
FIGS. 14 and 15 are graphs respectively for a supported mass of 26 kg and for a supported mass of 116 kg, showing the movements, e.g. during a crash, of the plunger, of the core, and of the flow rate limiter of the energy absorber device in accordance with the invention.
Figure 15:
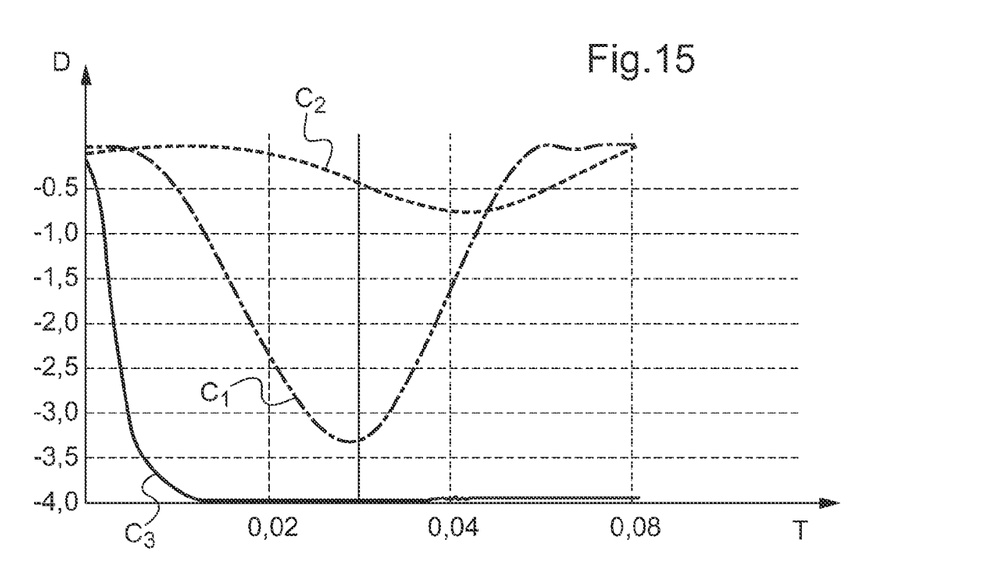

FIGS. 14 and 15 are graphs showing as a function of time the displacement, e.g. during a crash, of the punch 8a, of the core 10, and of the flow rate limiter 18 by means of respective curves C1, C2, and C3. Movements D in millimeters (mm) are plotted up the ordinate, and time in milliseconds (ms) is plotted along the abscissa. FIG. 14 applies to a supported mass of 26 kg, e.g. corresponding to a child, and FIG. 15 relates to a supported mass of 116 kg, e.g. corresponding to an adult.

The stroke of the flow rate limiter 18 plotted as curve C3 doubles when supporting a mass of 116 kg as compared with a mass of 26 kg. In contrast, the stroke of the curve 10 is smaller insofar as the device throttles more fluid. During a crash, the maximum stroke of the flow rate limiter 18 stabilizes around 2 mm for a mass of 26 kg, and around 4 mm for a mass of 116 kg. Independently of mass, it is thus possible to limit the peak acceleration suffered so as to avoid exceeding a safety threshold value, e.g. 14 g.

The energy absorber device in accordance with the invention presents the advantage of being completely self-contained and of not depending on any electrical or hydraulic circuit that might be damaged during a crash.

In addition, the purely mechanical design of the device in accordance with the invention and the absence of perishable elements minimize maintenance operations, which merely involve visual inspection.

The device in accordance with the invention adapts to the supported mass in a manner that is automatic without requiring any external adjustment, and it even takes account of variation in the apparent weight of a single person. Such variation could result, for example, by the passenger pressing the feet to a greater or lesser extent against the floor.

The device in accordance with the invention also presents the enormous advantage of making a multi-seat bench capable of adapting to variations in the total weight of its occupants.

The device is compact and can thus be inserted in a cockpit or fitted to existing seats. Costs associated with using it are therefore small.

Since the device in accordance with the invention does not involve making use of plastic deformation, it can be reused, e.g. after a hard landing that does not lead to said device being destroyed.

The operation of the device in accordance with the invention is particularly well suited to temperatures varying over the range 0° C. to 40° C.

What is claimed is:

1. An energy absorber device for damping the movements of a load support relative to a stationary base, said load support being connected to the stationary base via a hydromechanical connection, the hydromechanical connection including automatic and self-contained setting means serving firstly to adapt under static conditions to the weight of the loads supported by the support, and secondly under dynamic conditions to subject a subassembly comprising the support and the loads to acceleration or deceleration values that are below a threshold value;

the automatic and self-controlled setting means incorporating a hydraulic fluid throttling mechanism comprising:

a weighted element, that is movable relative to a stationary portion of the hydromechanical connection, thereby loading a first calibrated return spring under the effect of acceleration above a predetermined value; and a moving core, that is movable relative to the stationary portion, thereby loading a second calibrated return spring, said core defining part of a control chamber in a high pressure chamber and, as a function of the position of the core, enabling direct throttling of hydraulic fluid from the high pressure chamber towards a low pressure chamber;

said core being movable in translation, above the acceleration or deceleration threshold value, by the pressure difference between the high pressure chamber and the low pressure chamber, as a function of the combined position of the weighted element and of a flow rate limiter, the position of the flow rate limiter being representative of the weight supported by the subassembly comprising the support and the loads;

said core acting, as a function of the relative positions of the core and of the weighted element, to enable the high pressure chamber to communicate with the low pressure chamber via at least one calibrated feed orifice and via an internal chamber of the weighted element;

said internal chamber also presenting at least one additional orifice communicating with the control chamber and an exhaust orifice suitable for causing said internal chamber to communicate with the low pressure chamber;

said exhaust orifice being associated with the flow rate limiter that enables the throttling section of the exhaust orifice to be adjusted as a function both of the position of the flow rate limiter in the internal chamber and also of the position of the weighted element relative to the stationary portion;

said flow rate limiter being positioned in the internal chamber of the weighted element under the effect of the initial pressure that exists in the control chamber;

said flow rate limiter movable, under the effect of a high acceleration, together with the weighted element independently of its prepositioning in the internal chamber; and said flow rate limiter loading a third calibrated return spring housed in the low pressure chamber and bearing against the stationary portion.

2. An energy absorber device according to claim 1, wherein the automatic setting means enables a first automatic adjustment to be performed that depends on the weight of the loads, and a second adjustment to be performed that depends on the acceleration to which the subassembly comprising the support and the loads is subjected.

3. An energy absorber device according to claim 2, wherein the hydraulic fluid throttling mechanism is capable of throttling hydraulic fluid to control the flow rate of the hydraulic fluid between the high pressure chamber in which the hydraulic fluid is compressed by a movement of the support, and the low pressure chamber into which the throttled hydraulic fluid escapes.

4. An energy absorber device according to claim 3, wherein the high pressure and low pressure chambers are defined by cylindrical telescopic elements comprising a moving outer element defining part of the moving high pressure chamber that is secured to the support, and an inner stationary portion defining part of the low pressure chamber that is secured to the stationary base.

5. An energy absorber device according to claim 1, wherein the weighted element is a cylindrical punch, with the core, the high pressure chamber, the low pressure chamber, and the control chamber being coaxial around said cylindrical punch.

6. An energy absorber device according to claim 1, wherein the low pressure chamber is defined in part by a piston, which piston is held in place in the stationary portion by an abutment so as to release said piston to move when a predetermined pressure is reached in the low pressure chamber, by causing the abutment to break or to be deformed.

7. An energy absorber device according to claim 1, wherein the flow rate limiter includes mechanical means imparting movement in rotation simultaneously with axial sliding movement in the internal chamber under the effect of the pressure that exists in the control chamber and correspondingly modifying the throttling section through the exhaust orifice when said orifice is open as a result of the axial movement of the flow rate limiter entrained by the weighted element in response to a high acceleration.

8. A seat or bench including at least one energy absorber device according to claim 1.

9. An aircraft including a structure which structure includes at least one energy absorber device according to claim 1.

10. An aircraft undercarriage including at least one energy absorbing device according to claim 1.

11. A vehicle wheel suspension system including at least one energy absorbing device according to claim 1.

* * * * *